United States Patent
Hsu et al.

(10) Patent No.: US 6,909,600 B1
(45) Date of Patent: Jun. 21, 2005

(54) MECHANISM FOR QUICKLY REMOVING AN ELECTRONIC DEVICE FROM PC HAVING A SMALLER CASE

(75) Inventors: Hsin-An Hsu, Taipei (TW); Che-Fu Yeh, Taipei (TW)

(73) Assignee: First International Computer, Inc., Taipei (TW)

( * ) Notice: Subject to any disclaimer, the term of this patent is extended or adjusted under 35 U.S.C. 154(b) by 22 days.

(21) Appl. No.: 10/724,065

(22) Filed: Dec. 1, 2003

(51) Int. Cl.⁷ .............................................. G06F 1/16
(52) U.S. Cl. ..................... 361/685; 435/287; 399/26
(58) Field of Search ................................ 361/683–687, 361/725–727; 439/638; 435/287; 347/111; 399/26

(56) References Cited

U.S. PATENT DOCUMENTS 6,826,044 B2 * 11/2004 Gan et al. ................... 361/685
2004/0085725 A1 * 5/2004 Liu ............................. 361/685
2005/0007732 A1 * 1/2005 Hsu ............................ 361/685

* cited by examiner

*Primary Examiner*—Hung Van Duong
(74) *Attorney, Agent, or Firm*—Bacon & Thomas PLLC

(57) ABSTRACT

The present invention is to provide a mechanism for quickly removing an electronic device from a PC having a smaller case, which comprises a slot in the PC having one or more recesses at either side, enabling a tray installed with the electronic device to be inserted therein through a front opening of the slot and enabling one or more snapping members on either side of the tray to be adapted to snap into one or more recesses on the slot. In an operation of removing the electronic device from the PC, a user may pull a first clinging member of a pivotal gate at the front opening to open a gate upward, and then hold a handle of the tray to quickly pull the tray toward the front opening of the slot.

6 Claims, 4 Drawing Sheets

MECHANISM FOR QUICKLY REMOVING AN ELECTRONIC DEVICE FROM PC HAVING A SMALLER CASE

FIELD OF THE INVENTION

The present invention relates to detaching mechanisms and more particularly to an improved mechanism capable of quickly removing an electronic device from a PC (personal computer) having a smaller case.

BACKGROUND OF THE INVENTION

A PC having a smaller case is gaining popularity among users due to its small size, less space occupation, and being as powerful as a conventional desktop computer by installing electronic devices such as CD-ROM drive, hard disk, fan, etc. within the smaller case.

Thus, it is very important to customize the limited space of the PC having a smaller case for accommodating the above electronic devices therein since the PC having a smaller case only has a small internal space. Further, the arrangement of the electronic devices installed in the PC having a smaller case is very critical in both assembling the components in the assembly line and doing maintenance in the future. Typically, a plurality of screws are used to fasten each electronic device in a conformed frame of the smaller case of the PC for installing the electronic device therein.

However, the above technique of using a plurality of screws to fasten each electronic device in the conformed frame of the case has a couple of drawbacks. One drawback is that in a case of removing a malfunctioned electronic device for replacement or upgrading, a user has to sequentially detach the case and the panels, unfasten the screws from the frame of the electronic device by means of a screw driver, and finally detach the electronic device from the case. To the contrary, while installing an electronic device in the frame, a user has to sequentially insert the electronic device into the frame, fasten a plurality of screws at the frame by means of a screw driver, and finally assemble the case and the panels again. In view of the above, it is apparent that the assembling process is very tedious and time consuming within the narrow internal space of the case, and the electronic devices is also easily damaged during the assembling process. Moreover, the assembling speed in the assembly line will also become slow due to the narrow internal space of the case. Therefore, it is impossible to either quickly remove an electronic device from the small case of the PC or install the same therein by the prior technique of using screws to fasten or unfasten the electronic device to or from the PC having a smaller case.

Thus, it is desirable among users to provide a mechanism for quickly removing an electronic device from a PC having a smaller case or installing the same therein by utilizing the existing construction of PC in order to overcome the above drawbacks of the prior art.

SUMMARY OF THE INVENTION

The present invention is to provide a mechanism for quickly removing or installing an electronic device to or from a PC having a smaller case, which is able to overcome the above drawbacks of the prior art and effectively solve the problems of tedious and time consuming process of removing an electronic device from the PC having a smaller case or installing the same therein with in the narrow internal space of the PC through using a plurality of screws in fastening the electronic device in a conformed frame of the computer case and avoid other electronic devices in the PC from being damaged in the processes.

An object of the present invention is to provide a mechanism for quickly removing an electronic device from a PC having a smaller case. The mechanism comprises a slot in the PC, the slot including one or more recesses at either side, a tray for containing the electronic device (e.g., hard disk) adapted to insert into the slot through a front opening of the slot wherein one or more snapping members on either side of the tray are adapted to snap into one or more recesses on the slot. In an operation of removing the electronic device from the PC, a user may pull a first clinging member of a pivotal gate at the front opening of the slot to open a gate upward. Next, the hand of the user may hold a handle of the tray to quickly pull the tray toward the front opening of the slot. By utilizing the present invention, it is possible to quickly remove the electronic device from the PC without being hindered by the narrow internal space of the PC. As an end, the drawbacks of being impossible of quickly removing the electronic device from the PC and installing the same therein as experienced by the prior art can be overcome.

The above and other objects, features and advantages of the present invention will become apparent from the following detailed description taken with the accompanying drawings.

DETAILED DESCRIPTION OF THE PREFERRED EMBODIMENTS

Figure 1:
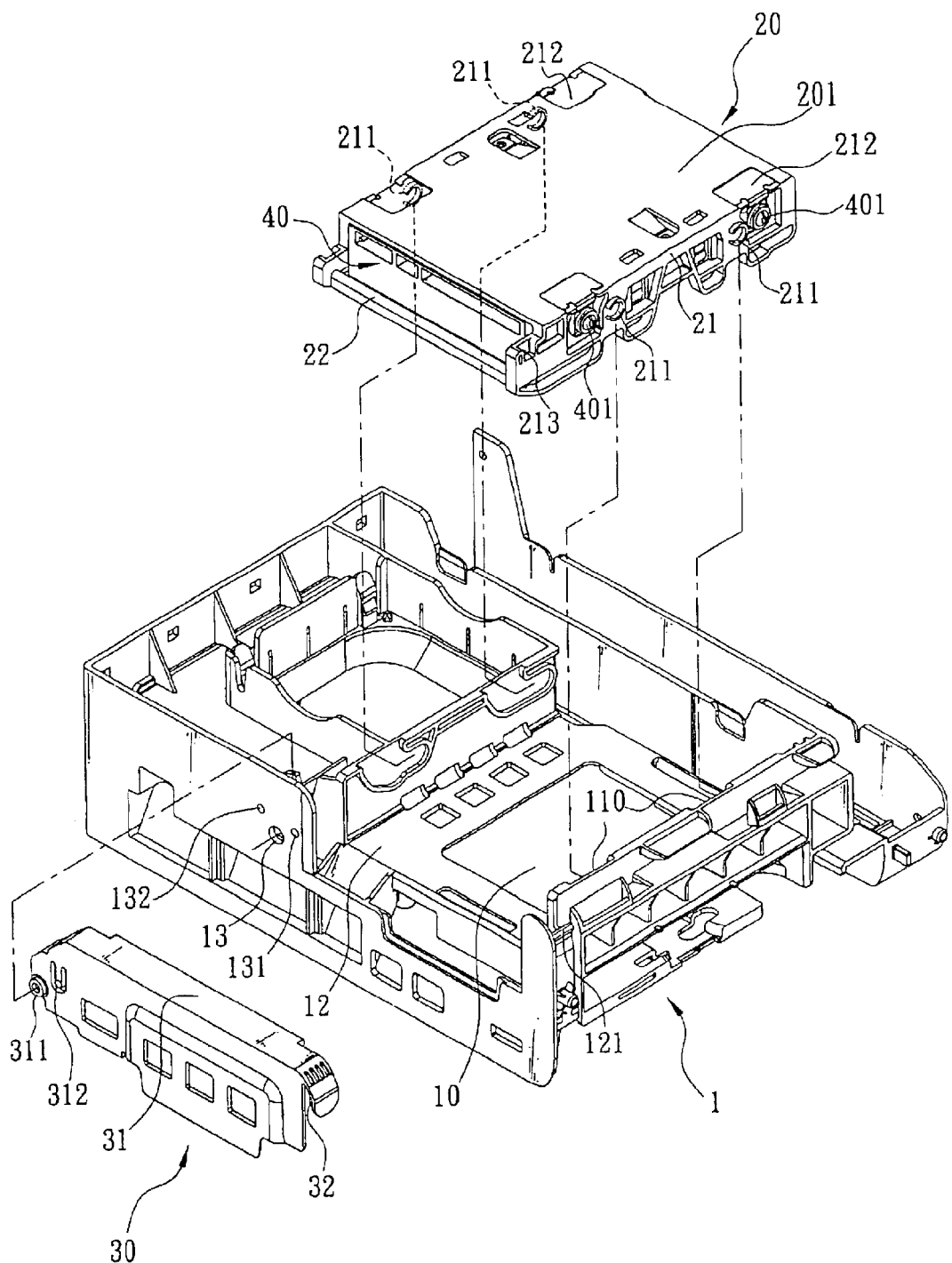
FIG. 1 is an exploded view of a mechanism according to the invention.
Figure 2:
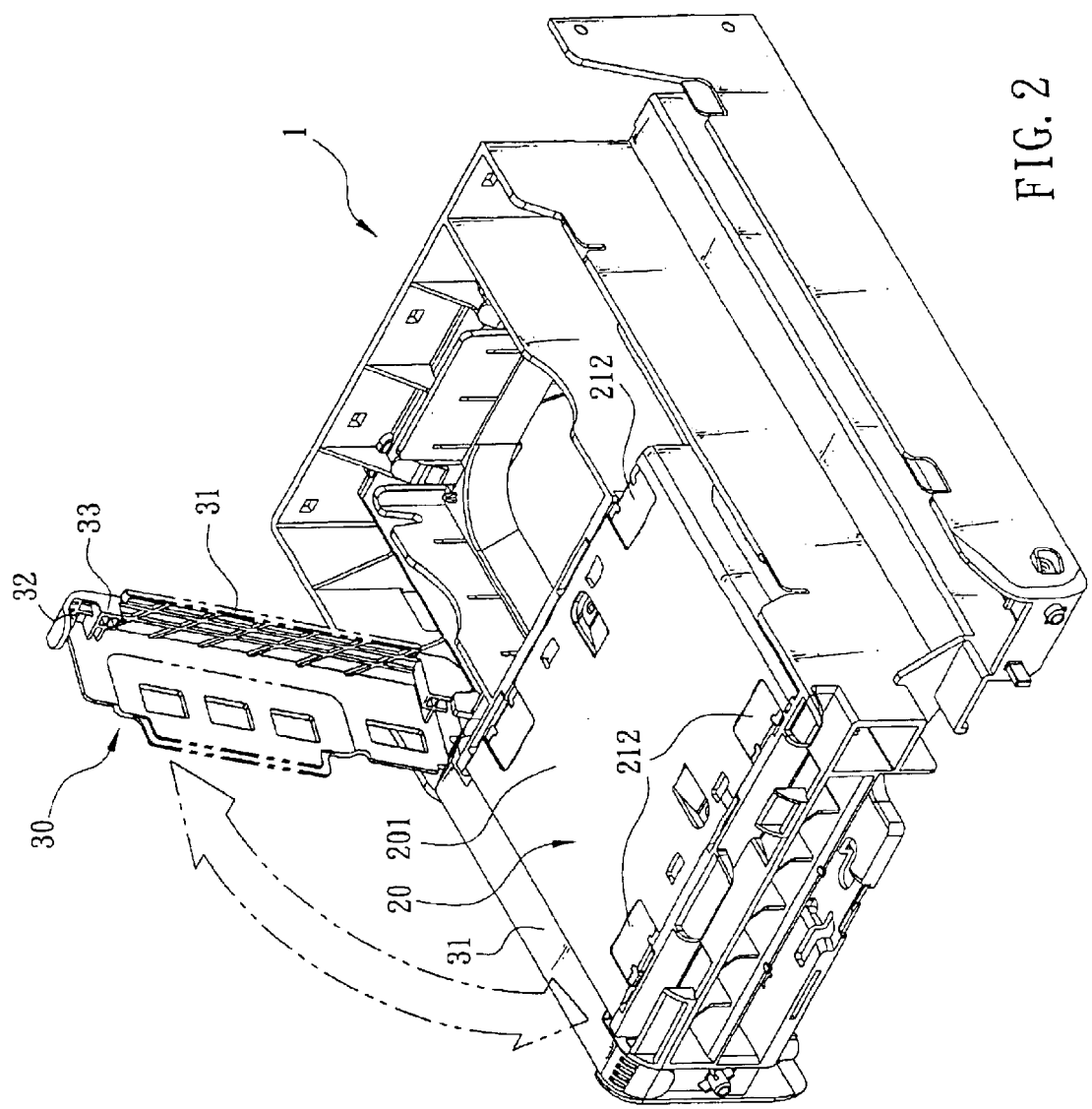
FIG. 2 is a perspective view of FIG. 1, the mechanism being shown during mounting.
Figure 3:
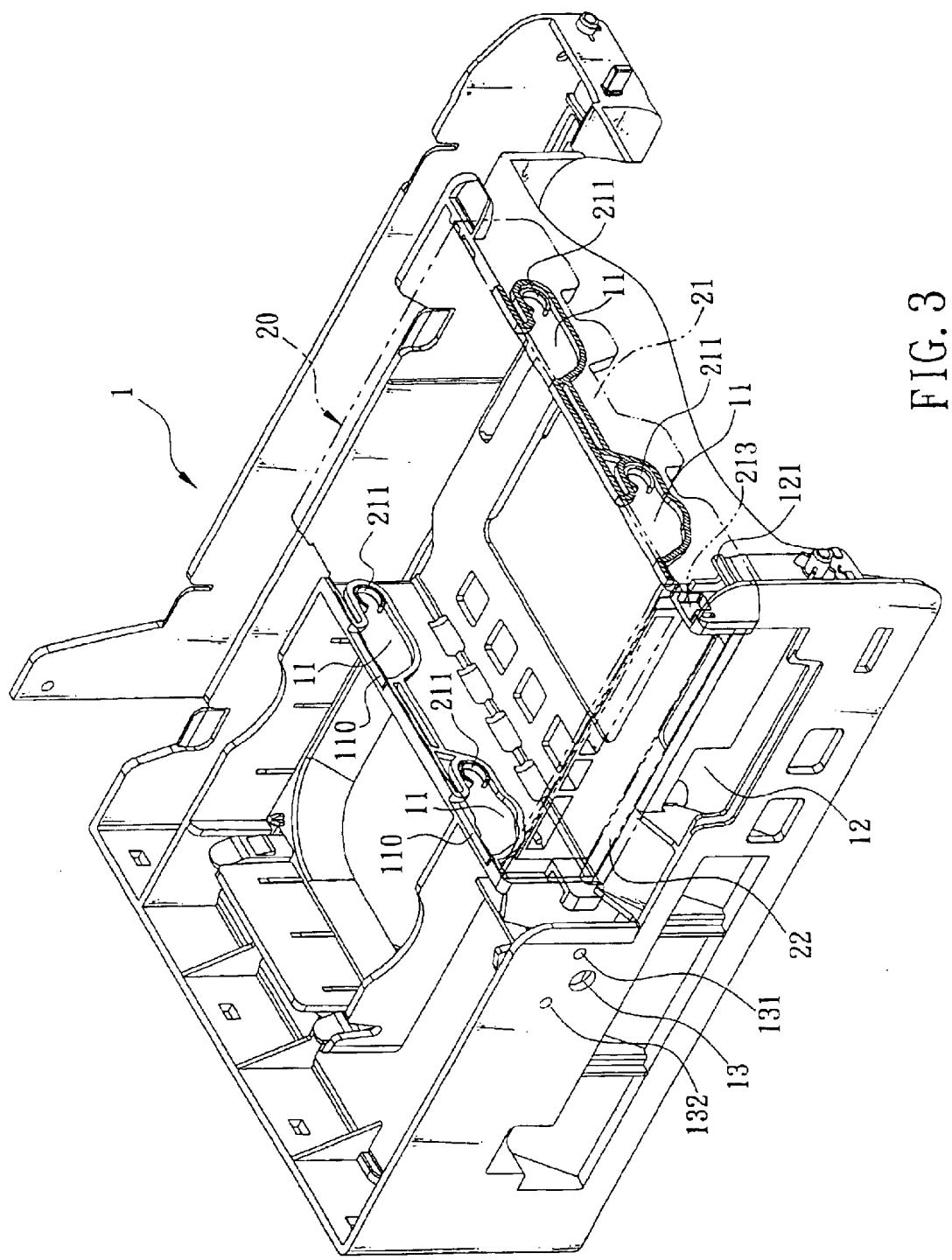
FIG. 3 is a perspective view illustrating the s napping arrangement of the invention.
Figure 4:
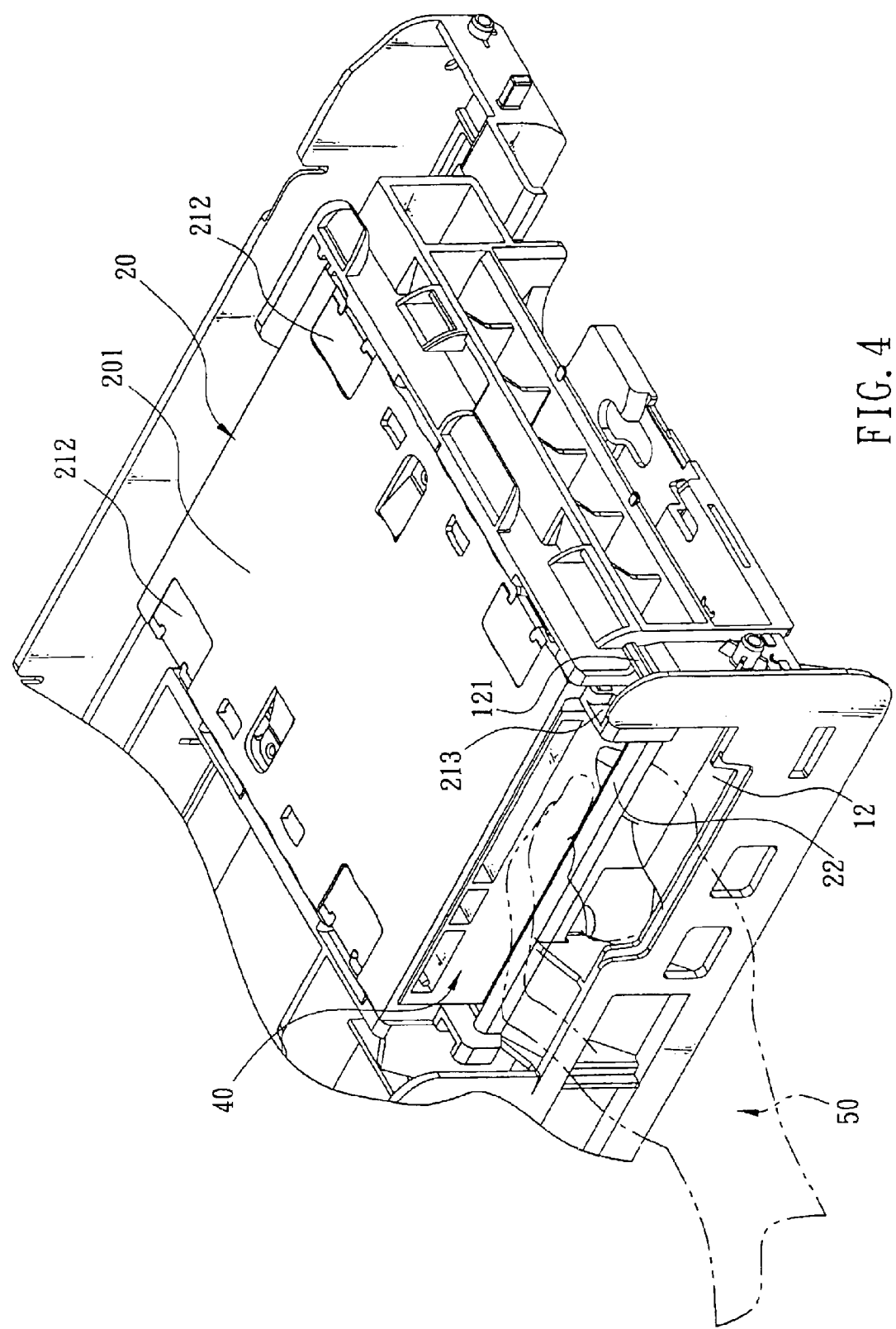
FIG. 4 is a perspective view illustrating the removal of an electronic device from the computer case.

Referring to FIGS. 1, 2, 3, and 4, there is shown a mechanism for quickly removing an electronic device from a parallelepiped PC having a smaller case (hereinafter referred to as computer) 1 in accordance with a preferred embodiment of the invention. The mechanism comprises a slot 10, a tray 20, and a gate 30 all contained in the computer 1 (see FIG. 1). One or more recesses 11 (two are shown) are formed at either side. In other words, there are two recesses 11 at one side of the slot 10 and there are two recesses 11 at the other side thereof. An opening 110 is formed at a top portion of the side and is extended downward, rearward at the same side to form the recess 11. The slot 10 further comprises a front opening 12 and a latch 121 at a corner adjacent the front opening 12.

In the embodiment, the tray 20 is adapted to insert into the slot 10 through the front opening 12. The tray 20 is shaped as an inverted U. The opening of the tray 20 is adapted to receive an electronic device 40. In the embodiment, the electronic device 40 is a hard disk A plurality of screws 401 are driven through both sides of the tray 20 to fasten the electronic device 40 therein (see FIG. 1). A snapping surface 21 is formed on either side of the tray 20. One or more snapping members 211 (two are shown) are formed on the snapping surface 21. At least one snapping member 211 of either snapping surface 21 is adapted to allow the tray 20 to insert into the slot 10 by sliding along the openings 110 of at least one recess 11 on the slot 10 (see FIGS. 1 and 3). Further, the tray 20 is completely, stably fastened in the slot 10 after being snapped at the closed ends of the recesses 11.

Moreover, one or more inverted L-shaped conductive members 212 (two are shown) are formed at a junction of either snapping surface 21 and a top 201 of the tray 20 wherein the junction of either snapping surface is perpendicular to the top 201 of the tray 20 (see FIG. 1). The provision of the conductive members 212 at the junction of either snapping surface 21 and the top 201 of the tray 20 makes it possible of being electrically grounded with respect to a cover (not shown) of the computer 1, one side of the tray 20, and the internal electronic device 40. This configuration has the advantage of prolonging the useful life of the electronic device 40.

In addition, a handle 22 is formed at a front side between two snapping surfaces 21 of the tray 20 (see FIG. 1). In use, the hand 50 of a user may hold the handle 22 to quickly remove the tray 20 from the slot 10 or install the same therein (see FIG. 4). Moreover, a cavity 213 is formed at one snapping surface 21 of the tray 20 adjacent the handle 22 (see FIGS. 1 and 4).

In the embodiment, the gate 30 is elongated and comprises a top plate 31 (see FIG. 1). The top plate 31 has a pivot shaft 311 and an adjacent resilient latch member 312 both at one end and a first clinging member 32 and a second clinging member 33 at the other end thereof (see FIG. 2). The pivot shaft 311 is pivotably provided at a pivot hole 13 at a front side of the slot 10 (see FIGS. 1 and 2). A hole 131 is provided at one side of the pivot hole 13 and another hole 132 is provided at the other side of the pivot hole 13 respectively in which the distance from one hole 131 to the pivot hole 13 is the same as that from the other hole 132 to the pivot hole 13. As such, the pivot shaft 311 of the gate 30 is able to pivot about the pivot hole 13 in opening or closing the gate 30. Also, two sides of the resilient latch member 312 are snapped into the holes 131 and 132 respectively for positioning. The first clinging member 32 is snapped into the latch 121 at one side of the slot 10 when the gate 30 is closed. Hence, the first clinging member 32 and the second clinging member 33 of the gate 30 are urged against the latch 121 of the slot 10 and the cavity 213 of the tray 20 respectively. As an end, the tray 20 is reliably fastened in the slot 10.

By configuring as above, in a case of removing the electronic device 40 from the computer 1 for replacement or upgrading, a user may sequentially detach the case of the computer 1, pull the first clinging member 32 of the gate 30 to disengage the latch 121 of the slot 10 and the second clinging member 33 from the cavity 213 of the tray 20. Also, pivot the gate 30 about the pivot shaft 311 for opening the gate 30 upward (see FIGS. 2 and 4). Thus, the hand 50 of a user may hold the handle 22 of the tray 20 to quickly pull the tray 20 toward the front opening 12 of the slot 10. At this time, at least one snapping member 211 on the snapping surface 21 of the tray 20 has disengaged from at least one recess 11 on the slot 10 and further is removed from the opening 110 by sliding. In such a manner, it is possible of quickly removing the tray 20 from the slot 10 either for replacing the electronic device 40 with a new one or for upgrading. Hence, the purpose of quickly removing the electronic device 40 from the computer 1 without being hindered by the narrow internal space of the computer 1 is achieved. As an end, the drawbacks of being impossible of quickly removing the electronic device 40 from the computer 1 and installing the same therein as experienced by the prior art can be overcome.

While the invention has been described by means of specific embodiments, numerous modifications and variations could be made thereto by those skilled in the art without departing from the scope and spirit of the invention set forth in the claims.

What is claimed is:

1. A mechanism for quickly removing an electronic device from a PC having a smaller case, comprising:

a slot in the PC, the slot comprising one or more recesses at either side, a front opening, and a latch at a corner adjacent the front side;

a tray adapted to insert into the slot through the front opening, the tray being shaped as an inverted U so as to receive the electronic device by inserting the electronic device through an opening thereof, the tray comprising a snapping surface on either side, one or more snapping members on either snapping surface, and a handle at a front side between the snapping surfaces, the handle being operative to hold for removing the tray from the slot or installing the same therein wherein the one or more snapping members are adapted to allow the tray to insert into the slot by sliding into the one or more recesses on the slot; and an elongated gate comprising a top plate having a pivot shaft at one end, a first clinging member at the other end wherein the pivot shaft is pivotably provided in a pivot hole at a front side of the slot, the pivot shaft of the gate is adapted to pivot about the pivot hole in opening or closing the gate, and the first clinging member is snapped into the latch of the slot when the gate is closed.

2. The mechanism of claim 1, wherein the recess is formed by providing an opening at a top portion of the side, the opening of the recess being extended downward, rearward at the same side.

3. The mechanism of claim 1, further comprising a second clinging member at the other end of the gate adjacent the first clinging member wherein the first and the second clinging members of the gate are urged against the latch of the slot and the cavity of the tray adjacent the handle respectively when the gate is closed, thereby securely fastening the tray in the slot.

4. The mechanism of claim 1, further comprising a resilient latch member at one side of the pivot shaft of the gate, a first hole at one side of the pivot hole, and a second hole at the other side of the pivot hole wherein a distance from the first hole to the pivot hole is the same as that from the second hole to the pivot hole so that two sides of the resilient latch member are adapted to snap into the first and the second holes respectively for positioning.

5. The mechanism of claim 1, further comprising one or more inverted L-shaped conductive members at a junction of either snapping surface and a top of the tray wherein the junction of either snapping surface is perpendicular to the top of the tray, and the conductive members at the junction of either snapping surface and the top of the tray makes it possible of being electrically grounded with respect to a cover of the PC, one side of the tray, and the electronic device within the tray.

6. The mechanism of claim 2, wherein the number of the recesses is four with two of them being at one side of the slot and the other two of them being at the other side of the slot.

* * * * *